United States Patent
Yoon et al.

(10) Patent No.: US 7,715,365 B2
(45) Date of Patent: May 11, 2010

(54) VOCODER AND COMMUNICATION METHOD USING THE SAME

(75) Inventors: Byung-Sik Yoon, Daejeon (KR); Song-In Choi, Daejeon (KR); Dae-Sik Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 1165 days.

(21) Appl. No.: 10/705,098

(22) Filed: Nov. 10, 2003

(65) Prior Publication Data

US 2004/0100955 A1 May 27, 2004

(30) Foreign Application Priority Data

Nov. 11, 2002 (KR) .................. 10-2002-0069607

(51) Int. Cl.
*H04L 12/66* (2006.01)
*H04L 12/56* (2006.01)
*H04J 3/22* (2006.01)
*H04B 1/38* (2006.01)

(52) U.S. Cl. ............... 370/352; 370/401; 370/465; 375/222; 455/561

(58) Field of Classification Search ......... 375/259–267, 375/340–343; 370/465–479, 400–401
See application file for complete search history.

(56) References Cited

U.S. PATENT DOCUMENTS

| | | | |
|---|---|---|---|
| 5,991,716 A | 11/1999 | Lehtimaki | |
| 6,463,414 B1 * | 10/2002 | Su et al. | 704/270.1 |
| 6,477,502 B1 * | 11/2002 | Ananthpadmanabhan et al. | 704/503 |
| 6,584,438 B1 * | 6/2003 | Manjunath et al. | 704/228 |
| 7,142,559 B2 * | 11/2006 | Choi et al. | 370/466 |
| 7,203,226 B1 * | 4/2007 | Rabipour et al. | 375/222 |
| 7,406,096 B2 * | 7/2008 | El-Maleh et al. | 370/466 |
| 2003/0055629 A1 * | 3/2003 | Choi et al. | 704/201 |
| 2004/0032860 A1 * | 2/2004 | Mundra et al. | 370/352 |
| 2009/0012784 A1 * | 1/2009 | Murgia et al. | 704/230 |
| 2009/0281799 A1 * | 11/2009 | El-Maleh et al. | 704/221 |

FOREIGN PATENT DOCUMENTS

EP 001083762 A1 * 3/2001

OTHER PUBLICATIONS

Sunil Lee et al., "Tandemless Transcoding for AMR and EVRC Speech Coders"; pp. 531-542; IMT-2000 (International Mobile Telecommunication 2000) Abstract, 2002.

* cited by examiner

*Primary Examiner*—Tri H Phan
(74) *Attorney, Agent, or Firm*—Blakely Sokoloff Taylor & Zafman

(57) ABSTRACT

Disclosed is a communication vocoder. An encoder and a decoder in a first format, and a decoder in a second format are formed in the communication vocoder. The encoder in the first format encodes voice signals into voice packets in the first format, and the decoder in the first format decodes the voice packets in the first format into voice signals. When voice packets in the second format are input to the communication vocoder, the decoder in the second format decodes the voice packets in the second format into voice signals. The decoders in the first and second formats are formed as subroutines in the communication vocoder.

7 Claims, 2 Drawing Sheets

VOCODER AND COMMUNICATION METHOD USING THE SAME

CROSS REFERENCE TO RELATED APPLICATION

This application claims priority to and the benefit of Korea Patent Application No. 2002-69607 filed on Nov. 11, 2002 in the Korean Intellectual Property Office, the content of which is incorporated herein by reference.

BACKGROUND OF THE INVENTION

1. Field of the Invention

The present invention relates to a communication vocoder (voice coder). More specifically, the present invention relates to a tandemless vocoder.

2. Description of the Related Art

As development of digital mobile communication systems has significantly accelerated, vocoders suitable for respective mobile communication systems have also been developed. RPE-LTP (regular pulse excited long term prediction) vocoders developed for European GSM digital mobile communication systems were replaced by EFR (enhancement full rate) GSM vocoders, which were subsequently replaced by AMR (adaptive multi rate) vocoders for varying the data rates according to characteristics of wireless transmission intervals. In particular, the AMR vocoders have been adopted for the 3rd generation mobile communication system, that is, the European (asynchronous) IMT-2000 system, because of their excellent voice quality and performance.

QCELP (Qualcomm code excited linear prediction) vocoders using the CDMA method were developed for the North American digital mobile communication system, 13 kbps QCELP vocoders with 13 kbps data rates were subsequently developed, and EVRC (enhancement variable rate codec) vocoders were finally developed. The North American (synchronous) IMT-2000 system standardization committee has completed the SMV (selectable mode vocoder) standardization of the AMR vocoders.

In general, communication between vocoders using different methods is executed by decoding voice packets with one method into voice signals, encoding the voice signals through another method, and decoding the encoded voice signals, which is referred to as the tandem method.

FIGS. 1 and 2 show block diagrams of conventional tandem vocoders. As shown in FIG. 1, the tandem communication method from an A-type vocoder 10 to a B-type vocoder 20 is performed by a secondary encode/decode module 30. That is, the voice packets encoded by an encoder 11 of the A-type vocoder 10 are decoded into voice signals in the PCM (pulse coded modulation) format by an A-type decoder 31, the voice signals are encoded again by a B-type encoder 32, and the encoded voice signals are transmitted to a decoder 21 of the B-type vocoder 20. Because the encoding/decoding processes are performed twice, the tandem communication method lowers communication quality, increases delay time, and needs secondary encode/decode modules 31, 32, 33, and 34 in the intermediate communication area.

To solve the problems, a method shown in FIG. 2 has been proposed. As shown, packet converters 41 and 42 are provided between the A- and B-type vocoders 10 and 20. The packet converter 41 mathematically analyzes a bit sequence of the packet encoded by the encoder 11 of the A-type vocoder 10, converts the same into a bit sequence for the B-type vocoder 20, and transmits the bit sequence to the decoder 21 of the B-type vocoder 20. In a like manner, the packet converter 42 converts a bit sequence of the packet encoded by the encoder 22 of the B-type vocoder 20 into a bit sequence for the A-type vocoder 10. However, even though the mathematical analysis is very accurate, its voice quality is worse than that generated by the encode/decode process of the encode/decode module, and it additionally requires an analyzer, thereby generating a delay time.

SUMMARY OF THE INVENTION

It is an advantage of the present invention to reduce both a delay time generated by a tandem vocoder, and additional hardware.

To achieve the advantage, the present invention performs tandemless communication between vocoders.

In one aspect of the present invention, a communication vocoder comprises: an encoder for encoding voice signals into voice packets in a first format; a first decoder for decoding voice packets in the first format into voice signals; and a second decoder for decoding voice packets in a second format into voice signals.

The communication vocoder further comprises a third decoder for decoding voice packets in a third format into voice signals, the third format being different from the first and second formats, and the first and second decoders are formed as subroutines.

In another aspect of the present invention, a communication method for a first terminal including a vocoder in the first format to communicate with a second terminal including a vocoder in the second format comprises: receiving voice packets encoded in the second format from the second terminal; and decoding the voice packets in the second format into voice signals by using a decoder in the second format.

The vocoder in the first format further comprises a decoder in the first format for decoding the voice packets encoded in the first format into voice signals.

The communication method further comprises: the first vocoder encoding voice signals into voice packets in the first format, and outputting the voice packets in the first format.

In still another aspect of the present invention, a media gateway being connected between a terminal and a packet network and allowing network telephone communication comprises: an encoder for encoding voice signals provided from the terminal into voice packets in the first format, and transmitting them to the packet network; a first decoder for decoding the voice packets in the first format provided from the packet network into voice signals, and transmitting the voice signals to the terminal; and a second decoder for decoding the voice packets in the second format provided from the packet network into voice signals, and transmitting the voice signals to the terminal.

The first and second decoders are formed as subroutines.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
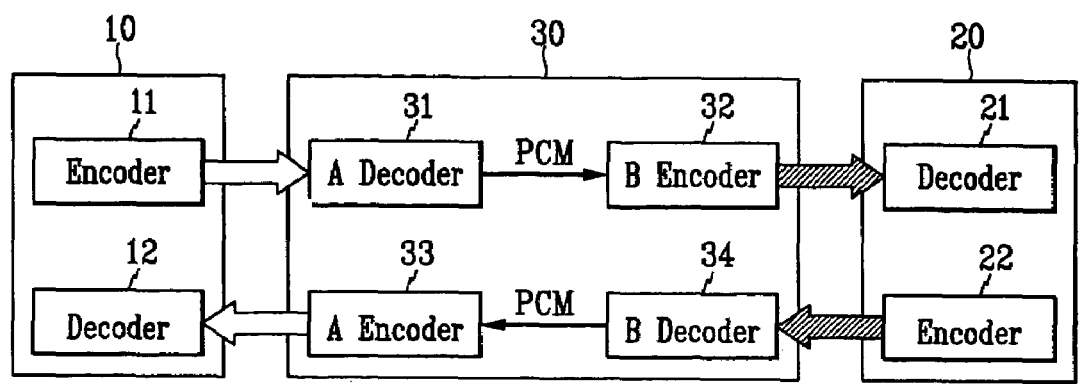
FIGS. 1 and 2 respectively show block diagrams of tandem vocoders.
Figure 2:
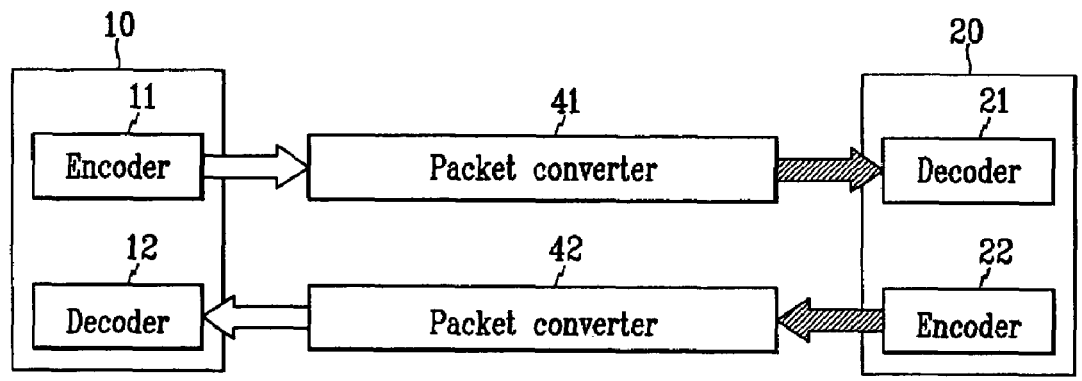
Figure 3:
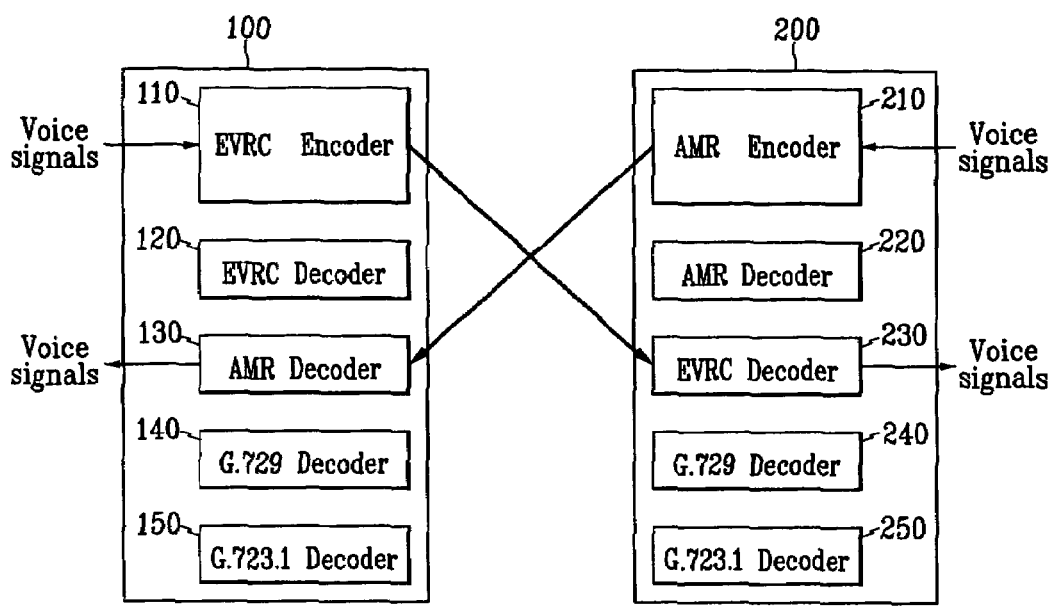
FIG. 3 shows a brief block diagram of a vocoder according to a preferred embodiment of the present invention.

FIG. 3 shows a brief block diagram of a vocoder according to a preferred embodiment of the present invention, showing a voice signal transmission between an EVRC vocoder 100 and an AMR vocoder 200.

As shown, the EVRC vocoder 100 comprises an EVRC encoder 110, an EVRC decoder 120, and an AMR decoder 130, and the AMR vocoder 200 comprises an AMR encoder 210, an AMR decoder 220, and an EVRC decoder 230. The EVRC decoder 120 and the AMR decoder 130 are formed as subroutines in the EVRC vocoder 100, and the AMR decoder 220 and the EVRC decoder 230 are formed as subroutines in the AMR vocoder 200.

The EVRC encoder 110 encodes voice signals in the PCM (pulse coded modulation) format into voice packets in the EVRC format, and the AMR encoder 210 encodes voice signals in the PCM format into voice packets in the AMR format. The EVRC decoder 120 decodes the voice packets encoded in the EVRC format into voice signals in the PCM format, and the AMR decoder 220 decodes the voice packets encoded in the AMR format into voice signals in the PCM format. The AMR decoder 130 in the EVRC vocoder 100 decodes voice packets encoded in the AMR format into voice signals in the PCM format when the EVRC vocoder 100 receives the voice packets. In a like manner, when the AMR vocoder 200 receives voice packets encoded in the EVRC format, the EVRC decoder 230 in the AMR vocoder 200 decodes the voice packets into voice signals in the PCM format.

In detail, when voice signals are input to the EVRC vocoder 100, the EVRC encoder 110 of the EVRC vocoder 100 encodes the voice signals into voice packets in the EVRC format and outputs them to the AMR vocoder 200. The AMR vocoder 200 decodes the voice packets encoded in the EVRC format by using the EVRC decoder 230 to output original voice signals. In the same manner, when voice signals are input to the AMR vocoder 200, the AMR encoder 210 of the AMR vocoder 200 encodes the voice signals into voice packets in the AMR format and outputs them to the EVRC vocoder 100. The EVRC vocoder 100 decodes the voice packets encoded in the AMR format by using the AMR decoder 130 to output original voice signals.

Further, the EVRC vocoder 100 and the AMR vocoder 200 can respectively include a decoder for decoding the voice packets encoded by a different-format vocoder such as G.729 and G.723.1. For example, as shown in FIG. 3, the EVRC vocoder 100 and the AMR vocoder 200 can further comprise G.729 decoders 140 and 240, and G.723.1 decoders 150 and 250. Accordingly, the EVRC vocoder 100 and the AMR vocoder 200 decode voice packets encoded in the G.729 and G.723.1 formats, and process them. The EVRC vocoder and the AMR vocoder are exemplified in the present embodiment, and without being restricted to this, other types of vocoders can also be applied.

Mobile communication vocoders such as the EVRC, AMR, G.729, and G.723.1 vocoders use the CELP (code excited linear prediction) method, their basic structures are almost the same, and accordingly, the different vocoders use very similar basic functions. For example, in order to realize the EVRC vocoder in real-time, it is important to configure an EVRC program by using the basic functions, and the basic functions of the EVRC vocoder are very similar to those of the AMR vocoder having the CELP structure. In particular, the SG16 (study group 16) of the ITU-T (International Telecommunication Union-Telecommunication) provides the basic functions through the STL 2000 (Standard Telecommunication Library 2000). That is, even different vocoders can use the same basic functions since they use the same STL 2000 for developing the vocoders.

In the vocoder of the CELP structure, the encoder includes a plurality of functions for LPC (linear prediction coefficient) analysis using input signals, LSP (line spectrum pair) conversion of the LPC, vector quantization of the LSP, retrieval of an adaptive codebook and a fixed codebook using analysis by synthesis, retrieval of a gain value of an exciter, and re-updating of respective digital filter values. However, since the decoder has dequantization filters of transmit filters and several digital filters, the structure and complexity of the decoder is very simple compared to those of the encoder. Actually, the decoder in the vocoder realization of the general CELP structure occupies substantially 10 to 20% of program capacity, and its complexity is less than 10%. Hence, when a decoder with a different format is implemented as a subroutine in the vocoder, no great influence is provided to the total capacity and complexity of the vocoder.

No additional hardware or software such as the secondary encode/decode module used for the conventional tandem method is needed in the preferred embodiment of the present invention, and since the encoding and decoding process is executed once, voice quality is better than the conventional method.

The above-noted embodiment can be applied to VoIP (voice over Internet protocol) terminals, which will be described with reference to FIG. 4.

Figure 4:
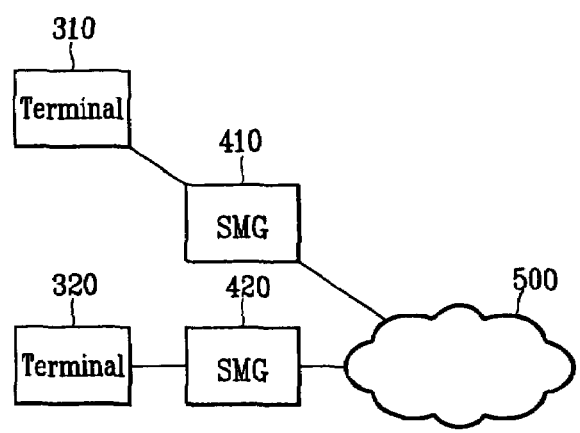
FIG. 4 shows a VoIP network using a vocoder according to a preferred embodiment of the present invention.

FIG. 4 shows a VoIP network using the vocoder according to the preferred embodiment of the present invention.

As shown, terminals 310 and 320 are connected to a packet network 500 through subscriber media gateways 410 and 420 to which the vocoders 100 and 200 are formed. The terminals 310 and 320 include a computer, a VoIP mobile terminal, and an IP phone.

Voice signals transmitted from the terminal 310 are encoded into voice packets in the EVRC format by the subscriber media gateway 410, and transmitted to a packet network 500. After undergoing call processing on the packet network 500, the voice packets are transmitted to the terminal 320 through the subscriber media gateway 420. In this instance, the subscriber media gateway 420 decodes the voice packets in the EVRC format and transmits them to the terminal 320.

Accordingly, a vocoder including an encoder of one format and decoders of plural formats is formed in the subscriber media gateways 410 and 420. As described, vocoders of all formats do not need to be formed in the subscriber media gateways 410 and 420, but only the vocoder according to the preferred embodiment is needed.

Therefore, no additional hardware or software such as the secondary encode/decode modules used for the conventional tandem method is required, and the present invention has better voice quality than the conventional one because of single execution of encoding and decoding.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A communication vocoder comprising:
   a single encoder for encoding input voice signals into voice packets for transmitting in a first format;
   a first decoder for decoding received voice packets in the first format into voice signals for output from the vocoder;
   a second decoder for decoding received voice packets in a second format into voice signals for output from the vocoder, said second format different from said first format; and
   a third decoder for decoding received voice packets in a third format into voice signals for output, the third format being different from the first and second formats,
   wherein said single encoder and first, second and third decoders enable said vocoder to perform two directional communications without tandem coding.

2. The communication vocoder of claim 1, wherein the first and second decoders are formed as subroutines.

3. A communication method for a first terminal including a first vocoder which encodes and decodes in a first format to communicate with a second terminal including a second vocoder which encodes and decodes in a second format, said second format different from said first format, said method comprising:
   wherein the first vocoder includes a single encoder for encoding input voice signals into voice packets for transmitting in the first format,
   receiving voice packets encoded in the second format from the second terminal; and
   decoding the voice packets in the second format into voice signals for outputting from the first vocoder by using a first decoder which decodes signals in the second format;
   receiving voice packets encoded in the first format from the first terminal; and
   decoding the voice packets in the first format into voice signals for outputting from the second vocoder by using a second decoder which decodes signals in the first format,
   wherein said single encoder and first and second decoders enable said first and second vocoders to perform two directional communications without tandem coding.

4. The communication method of claim 3, wherein the vocoder which encodes and decodes in the first format further comprises a decoder in the first format for decoding the voice packets encoded in the first format into voice signals.

5. The communication method of claim 3, further comprising: the first vocoder encoding voice signals into voice packets in the first format by using the single encoder, and outputting the voice packets in the first format.

6. A media gateway being connected between a terminal and a packet network and allowing network telephone communication, comprising:
   a single encoder for encoding voice signals provided from the terminal into voice packets in a first format, and transmitting the voice packets to the packet network;
   a first decoder for decoding the voice packets in the first format provided from the packet network into voice signals, and transmitting the voice signals to the terminal;
   a second decoder for decoding received voice packets in a second format provided from the packet network into voice signals, and transmitting the voice signals to the terminal, said second format different from said first format; and
   a third decoder for decoding received voice packets in a third format into voice signals for output, the third format being different from the first and second formats,
   wherein said single encoder and first, second and third decoders enable said vocoder to perform two directional communications without tandem coding.

7. The media gateway of claim 6, wherein the first and second decoders are formed as subroutines.

* * * * *